United States Patent Office 2,983,701
Patented May 9, 1961

2,983,701

POLYCONDENSATION PRODUCT OF A QUINONE AND A PHENOL, METHOD FOR PREPARING SAME, MIXTURE THEREOF WITH A POLYAMIDE, AND FIBER THEREOF

David Tanner, Wilmington, Del., assignor to E. I. du Pont de Nemours and Company, Wilmington, Del., a corporation of Delaware No Drawing. Filed Sept. 12, 1958, Ser. No. 760,543

13 Claims. (Cl. 260—42)

This invention relates to fiber-forming polyamides and to reinforcement of said polyamides and yarns made therefrom by addition of reinforcing resins.

An object of this invention is to provide a novel type of thermoplastic and heat-stable reinforcing resin compatible with nylon.

Another object is to provide a composition of nylon polymer containing a novel reinforcing resin.

Still another object of this invention is to provide a resin-modified nylon yarn of improved initial modulus, lower cold growth and lower cold creep.

According to this invention, there is provided a polycondensation product of a quinone and a phenol, having recurring units of the formula:

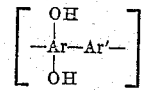

wherein Ar consists of at least one benzene nucleus, the hydroxyl groups being attached to a single benzene nucleus in a para-orientation, and Ar' is either (1) an alkyl phenol of the formula:

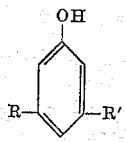

wherein R is hydrogen or an alkyl group having from 1–4 carbon atoms and R' is an alkyl group having from 1–4 carbon atoms, or (2) a naphthalene diol wherein the hydroxyl groups are separated by three or four carbon atoms, such as naphthalene diol 1,3, naphthalene diol 1,4 and naphthalene diol 1,8.

A preferred quinone is para-benzoquinone and preferred alkyl phenols are meta-cresol and 3,5-xylenol, polycondensation products of these compounds providing the most highly improved reinforced nylon yarns. Naphtholene quinone also provides highly satisfactory yarns.

The resins of this invention can be prepared by dissolving one of the above phenols and a quinone (in a ratio of about 1:2, respectively) in a suitable solvent, such as normal-propanol or acetone, and polycondensing the reactants in the presence of an acid catalyst, such as 5–10 drops 50% aqueous sulfuric acid, at a temperature in the range of from about 50 to about 100° C., preferably at the boiling temperature of the solvent (97° C. for normal-propanol).

The quinone-alkyl phenol polymers are particularly useful for reinforcing polyamides. For this purpose, the most suitable molecular weight range of the quinone-alkyl phenol resins is defined by a "degree of polymerization" of from 3 to the limit of compatibility with nylon, which is about 50. The preferred range is from a degree of polymerization of 5 to 20. By the expression "degree of polymerization" is meant the average number of repeating units in the polymer chain. In the preferred molecular weight range, the compatibility with nylon is well in excess of 10% by weight. Concentrations of resin higher than 10%, however, result in low tenacity and effect poor processability of the yarn. The concentration of the resin added should be in the range 0.1 to 10%. The preferred range is from about 3 to about 10% by weight.

The polycondensation products of this invention are particularly suitable for reinforcing linear polyamides whose amide linkages are an integral part of the polymer chain. These include polyamides prepared by reactions of diamines and dicarboxylic acids and polyamides prepared from amino acids.

The resin of this invention may be dissolved in a suitable solvent, such as ethanol, and added during the polymerization process for the polyamide either to the salt solution in the evaporator prior to evaporation, or to the evaporator after evaporation and cooling to about 75° C., or to the polymer melt at the end of the polymerization, or to the polymer flake before extrusion.

EXAMPLE I

Four moles of p-benzoquinone and 1 lb. of acetone are charged to a 2 liter resin kettle equipped with stirrer and thermometer. After solution is complete, 2 moles of m-cresol are added with stirring at 65° C., followed by 10 drops of 50% aqueous sulfuric acid. Stirring is continued at 80–90° C. (some acetone removed to allow temperature rise) until the condensation has proceeded to the point that a film-forming polymer is obtained (48 hrs.). This is determined by formation of a film on a glass rod which is inserted into the reaction mixture and removed for cooling and evaporation of the acetone. The solvent and the hydroquinone by-product are removed by heating the reaction product to 180° C. under 0.5 mm. mercury pressure. The resin has a melting point of 106° C., and a relative viscosity in absolute alcohol (10% solids) of 1.63.

Polyhexamethylene adipamide is prepared following the technique described in U.S. Patent 2,071,250. The polymer melt is spun as described in U.S. Patent 2,571,975 and drawn to a 60 denier, 10 filament yarn as described in U.S. Patent 2,289,232. Its break elongation, tenacity, initial modulus ($M_i$), cold growth and cold creep are measured with an Instron Tester, as recorded in Table I for "control" yarn.

Polyhexamethylene adipamide is prepared as described above, except that 5% p-benzoquinone m-cresol resin, dissolved in ethyl alcohol as a 33% solution, is added after evaporation of water during the polymerization cycle. The melt is spun and drawn like the control. The same properties are measured and recorded in Table I for these reinforced yarns.

The procedure is again repeated using 5% p-benzoquinone 3,5-xylenol resin.

Table I

| Resin | Break, Elongation (Percent) | Tenacity, g.p.d. | $M_i$, g.p.d. $\times 10^{-2}$ | Cold Growth (Percent) | Cold Creep (Percent) |
|---|---|---|---|---|---|
| None | 13 | 7.0 | 43 | 2.8 | 0.44 |
| Quinone M-cresol | 12 | 5.8 | 57 | 2.1 | 0.40 |
| Quinone 3,5-xylenol | 9 | 6.4 | 61 | 1.7 | 0.12 |

In each case the yarn is drawn at a draw ratio of 5.40 using a hot pin (80° C.) and a hot plate (170° C.), at a Z twist of ¾ per inch.

The break elongation is the percentage of original length the yarn can be stretched before it breaks.

The tenacity is the quotient of the breaking strength (in grams) and denier.

The initial modulus ($M_i$) represents the load in grams required per denier for the first 1% elongation at a temperature of 78° F. and relative humidity of 72%.

The cold growth represents the percent elongation the yarn shows when held under 1 gram per denier load for 30 minutes at a temperature of 70° F. and a relative humidity of 72%.

The cold creep represents the percent elongation during the last 29½ minutes of cold growth measurement.

Particularly desirable results are obtained when the resins of this invention are used to reinforce polyamides derived from diamines of the general formula

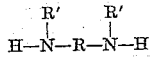

where R' is alkyl or hydrogen and R is a divalent hydrocarbon radical free from ethylenic unsaturation and containing at least 2 carbon atoms which separate the nitrogen. Particularly suitable yarns are provided from polyamides derived from diamines in which R is $(CH_2)_x$ wherein $x$ is at least 4 and not greater than 10.

Other preferred polyamides which are advantageously reinforced with the resins of this invention are those derived from diamines of the general formula:

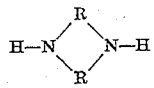

wherein R is defined as above. Especially useful within this class is piperazine.

Suitable co-reactants with the above diamines include dicarboxylic acids of the general formula:

HOOC—R''—COOH wherein R'' is a divalent hydrocarbon radical free from ethylenic unsaturation and containing at least 3 carbon atoms which separate the carboxyl groups. Particularly suitable within this group are the dicarboxylic acids wherein R'' is $(CH_2)_y$ wherein $y$ is at least 3 and not greater than 8, as polyamides derived from these acids provide particularly desirable qualities in nylon yarns.

The polyamides prepared from diamines and dicarboxylic acids have the repeating unit:

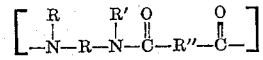

wherein R, R', and R'' are as defined above.

The polyamides prepared from aminoacids have the repeating unit:

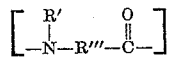

wherein R' is as defined above and R''' may be $(CH_2)_z$ and $z$ may be from 4 to 11. Particularly suitable reinforced yarns are prepared from polyamides prepared by polymerization of ω-amino caproic acid or its lactam, ω-caprolactam.

I claim:
1. The polycondensation product having recurring units of formula:

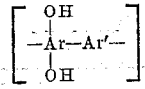

wherein Ar consists of at least one benzene nucleus, the hydroxyl groups being attached to a single benzene nucleus in a para- orientation, and Ar' is a radical selected from the group consisting of:
(1) an alkyl phenol of the formula:

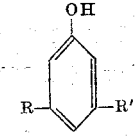

wherein R is one of the group consisting of hydrogen and an alkyl group having from 1–4 carbon atoms and R' is an alkyl group having from 1–4 carbon atoms, and
(2) a naphthalene diol wherein the phenolic hydroxyl groups are separated by at least three carbon atoms.

2. The polycondensation product of claim 1 wherein Ar is a benzene nucleus and Ar' is an alkyl phenol wherein R and R' are methyl.

3. The polycondensation product of claim 1 wherein Ar is a benzene nucleus and Ar' is an alkyl phenol wherein only R' is present and is methyl.

4. A synthetic linear polyamide having amide linkages as an integral part of the polymer chain and containing up to about 10% by weight of the polycondensation product of claim 1.

5. The polyamide of claim 4 wherein the polycondensation product is present in an amount of from about 3 to about 10% by weight.

6. The process for preparing the polycondensation product of claim 1 comprising dissolving the phenol and the quinone in a ratio of 1:2, respectively, in a solvent and polycondensng the reactants, in the presence of a sulfuric acid catalyst, at a temperature of from abuot 50 to about 100° C.

7. The process of claim 6 wherein the solvent is acetone.

8. The process of claim 6 wherein the acid catalyst is aqueous sulfuric acid.

9. The process of claim 6 wherein the quinone is para-benzoquinone.

10. The process of claim 9 wherein the phenol is meta-cresol.

11. The process of claim 9 wherein the phenol is 3,5-xylenol.

12. A fiber comprising the polyamide of claim 5.

13. The fiber of claim 12 wherein the polyamide comprises polyhexamethylene adipamide.

No references cited.

UNITED STATES PATENT OFFICE
CERTIFICATE OF CORRECTION

Patent No. 2,983,701             May 9, 1961

David Tanner

It is hereby certified that error appears in the above numbered patent requiring correction and that the said Letters Patent should read as corrected below.

Column 3, lines 44 to 46, the formula should appear as shown below instead of as in the patent:

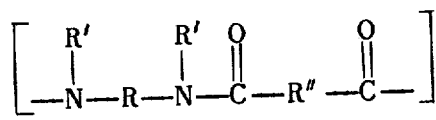

column 4, line 40, for "polycondensng" read -- polycondensing --.

(SEAL)        Signed and sealed this 28th day of November 1961.

Attest:

ERNEST W. SWIDER           DAVID L. LADD
Attesting Officer             Commissioner of Patents

USCOMM-DC